United States Patent [19]

Kagimasa et al.

[11] Patent Number: 4,868,740
[45] Date of Patent: Sep. 19, 1989

[54] SYSTEM FOR PROCESSING DATA WITH MULTIPLE VIRTUAL ADDRESS AND DATA WORD LENGTHS

[75] Inventors: Toyohiko Kagimasa, Hachiouji; Yoshiki Matsuda, Kokubunji; Kikuo Takahashi, Hachiouji; Seiichi Yoshizumi, Hino, all of Japan

[73] Assignee: Hitachi, Ltd., Tokyo, Japan

[21] Appl. No.: 56,885

[22] Filed: Jun. 3, 1987

[30] Foreign Application Priority Data

Jun. 4, 1986 [JP] Japan .................. 61-127918

[51] Int. Cl.⁴ ............... G06F 12/00; G06F 12/02; G06F 12/04; G06F 12/08
[52] U.S. Cl. .................. 364/200; 364/245; 364/245.1; 364/252; 364/254.9; 364/256.3; 364/256.6
[58] Field of Search ... 364/200 MS File, 900 MS File, 364/300

[56] References Cited

U.S. PATENT DOCUMENTS

| | | | |
|---|---|---|---|
| 4,541,047 | 9/1985 | Wada et al. | 364/200 |
| 4,675,809 | 6/1987 | Omoda et al. | 364/200 |
| 4,679,140 | 7/1987 | Gotou et al. | 364/200 |
| 4,739,470 | 4/1988 | Wada et al. | 364/200 |

FOREIGN PATENT DOCUMENTS 54-95129  7/1979  Japan .................. 364/200

OTHER PUBLICATIONS

MC68000, 16–Bit Microprocessor User's Manual Preliminary, (Sep. 1, 1979), pp. (2–1) to (3–7).
IBM System/370 Principles of Operation (1983), pp. (5–4) to (5–10) and (7–1) to (7–8).

Primary Examiner—Archie E. Williams, Jr.
Assistant Examiner—Robert B. Harrell
Attorney, Agent, or Firm—Antonelli, Terry & Wands

[57] ABSTRACT

A data processor which specifies either of a predetermined maximum length of an adddress (a bits) and a length of an address less than the former length and at plural registers having a number of length of bits (r bits) of the maximum address length or greater. The data processor reads out lower-order d bits for data or r bits for an address of the one of the plural registers (7) specified by a first instruction to perform an arithmetic or logic operation, and writes the result into one of the plural registers. Moreover, the processor reads out bits having specified length of an address from the one of the plural registers specified in a second instruction to generate an a-bit address, and reads out d for data or r bits for an address from a main storage device (5) in response to the thus-generated address to write the d or r bits into one of the plural registers. Since the data length is consistently d bits irrespective of specified effective length of an address, direct data transfer is enabled between programs each having a different effective length of an address thereby facilitating extension of the length of a storage address and assuring compatibility with conventional data processors.

13 Claims, 5 Drawing Sheets

FIG. 5
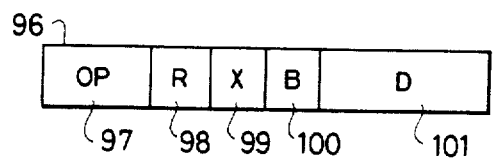
FIG. 6
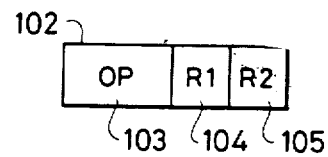
FIG. 7
| PROGRAM STATUS WORD BITS (SIGNAL AM) | | SELECTOR OUTPUT |
|---|---|---|
| A1 | A2 | |
| 0 | 0 | OUTPUT OF REGISTER 76 (24 BIT MODE) |
| 1 | 0 | OUTPUT OF REGISTER 75 (31 BIT MODE) |
| 0/1 | 1 | OUTPUT OF REGISTER 74 (48 BIT MODE) |
FIG. 8
| PROGRAM STATUS WORD BITS | | | SIGNAL AI | SIGNAL LS |
|---|---|---|---|---|
| A1 | A2 | V | | |
| 0/1 | 0/1 | 0/1 | 0 | 0 |
| 0/1 | 0/1 | 0 | 1 | 1 |
| 0 | 0 | 1 | 1 | 0 |
| 1 | 0 | 1 | 1 | 0 |
| 0/1 | 1 | 1 | 1 | 1 |

SYSTEM FOR PROCESSING DATA WITH MULTIPLE VIRTUAL ADDRESS AND DATA WORD LENGTHS

BACKGROUND OF THE INVENTION

1. Field of the Invention

The present invention relates generally to data processing which is performed using a large-capacity main storage device and, more particularly, to a method of and an apparatus for effecting data processing both of which are suitable for the extension of the length of a storage address and assuring compatibility with a conventional type of data processor.

2. Description of the Prior Art

A typical technique of extending the length of main storage addresses used in a data processor is discussed in a manual provided by IBM, "IBM System/370, Extended Architecture Principles of Operation (1983), pp. 5-4 to 5-10 and pp. 7-1 to 7-8". This prior art adopts a so-called virtual storage system which includes two kinds of mode of address virtual length, i.e., 24-bit and 31-bit modes and in which fixed point data and logic data have a data of length of a word, that is, 32 bits. A word is a basic building block of a data. Each of a plurality of general registers employed has a length of 32 bits, and data arithmetic or logic operation instructions such as addition and subtraction of data are prepared for the entire 32 bits of each of the general registers. However, since no address operation instruction dedicated to an arithmetic or logic operation of an address is prepared, arithmetic or logic operations on addresses are performed by means of the data operating instructions. During the execution of the data operation instructions, the entire 32 bits of any of the general registers is read out, and an arithmetic or logic operation is performed on the 32-bit data. The 32-bit result of the arithmetic or logic operation is written into one of the general registers. An instruction for accessing a main storage for an operand held therein specifies two general registers serving as a base register and an index register, respectively, both of which are used in generating the address of the operand. A virtual address for main-storage access is generated by adding the contents of the base register and the index register to a displacement included in the instruction code. In this case, if the length of the result of addition exceeds the length of the virtual address predetermined by a current mode of virtual address length, the excessive higher-order portion of the result is ignored. Therefore, such addition is commonly performed by reading out only the number of bits equivalent to the length of the virtual address for a current virtual address length mode from the base and index registers. More specifically, higher-order 24 bits upward from the least significant bit of the base or index register is read out in a 24-bit mode, and, in a 31-bit mode, the read out of higher-order 31 bits upward from the least significant bit is effected. A load instruction serving as one of the main-storage access instructions specifies the action of reading 32-bit data out of the main storage specified by the thus-generated address irrespective of the mode of the virtual address length, such read out data being written into the entire 32-bit field of a general register.

The virtual address length mode is specified by a 1-bit mode in a register holding a program status word indicating the status of various conditions in the processor. The mode bit can be changed by a mode change/branch instruction. The virtual address length mode is changed by changing the mode bit.

As described above, however, the prior art takes no account of the case where the length of an address is extended so greatly that the extended length of the address exceeds the length of data which is not extended, that is, the number of bits or length of a bit string of the general register. In such a case, if the prior art is used, it is required to extend the data length to a size equal to or greater than the extendedlength of the address so as to use data operation instructions for the purpose of executing arithmetic or logic operations on the extended data length.

However, extension of the data length would make it difficult to perform data transfer between an old program formulated before the data extension and a new program formulated after the same. For instance, if the non-extended length of data is 32 bits in the old program and the extended length of data in the new program is 64 bits, the 32-bit data must be converted to the 64-bit data so as to enable data transfer from the old program to the new program. This leads to a problem in that the extension of data length makes is difficult to assure compatibility between various data processors.

Another technique of extending the length of main storage addresses is shown in Japanese published laid-open patent application (Kokai tokkyo koho) 54-95129, wherein a data processor includes a circuit for generating an extended length address of 32 bits by use of general purpose registers of 32 bits so as to enable execution of instructions prepared for a main storage which is accessible by 24 bit addresses.

In this prior art it is disclosed that an extended-length address includes significant 24 bits at its lower bit portion and 8 bits of all zero at its upper bit portion, when the extended-length address is to be used to fetch an instruction from a main storage. Thus, this prior art enables the data processor to use already made control programs (operating system program) with less change.

In this prior art, however, length of data fetched from or stored into the main storage is presumed to be 32 bits. That is, the extended address does not still exceed the data length.

Therefore, this prior art has the same problem as mentioned above regarding the previously mentioned prior art.

SUMMARY OF THE INVENTION

It is therefore an object of the present invention to provide a method of and an apparatus for processing data, both of which enable efficient extension of main storage addresses with assuring compatibility with conventional types of data processors.

In order to achieve the above-described object, the present invention includes means for specifying either of a predetermined maximum address length (a bits) and an address length less than the same; and a plurality of registers each having the length (r bits) of a bit string equal to or greater than the maximum address length, in which lower-order d bits for data or r bits for an address in the one of the plurality of registers specified by a first instruction is read out to perform an arithmetic or logic operation on, the d or r bits result of such arithmetic or logic operation being written into one registers and in which the number of bits equivalent to a specified effective length is read out of one of the plurality of registers specified by a second instruction to generate an a-bit address for a main storage, d bits for data or r bits for an address being read out from a main storage in response to the thus-generated address to be written into one of the plurality of registers.

In this arrangement, data is loaded and stored by d-bit access means, and this enables direct transfer of data between a plurality of programs each having a different effective length of the address of an operand. It is therefore easy to assure compatibility with conventional types of data processors. Also, the number or length of bits equivalent to the effective length of an address is read out of the r-bit general register in accordance with the effective length of the address, thereby enabling extension of the length of the address of the main storage in excess of the d bits.

BRIEF DESCRIPTION OF THE DRAWINGS

FIG. 5 is an illustration of the arrangement of an RX instruction format used in the embodiment;

FIG. 6 is an illustration of the arrangement of an R instruction format used in the embodiment;

FIG. 7 is a table showing the operations of a selector associated with an address generating circuit;

FIG. 8 is a table showing the operations of a selector associated with the result of arithmetic or logic operations.

DETAILED DESCRIPTION OF THE PREFERRED EMBODIMENT

A preferred embodiment and its modified forms of the present invention will be described below with reference to FIGS. 1 to 9. The presently preferred embodiment adopts a virtual storage system and has three kinds of modes such as 24-bit-, 31 bit- and 48 bit-modes as the modes of a virtual address length (hereinafter referred to as "address mode"). Therefore, the effective length of an operand virtual address is changed to 24 bits, 31 bits or 48 bits in accordance with the respective modes.

Figure 9:
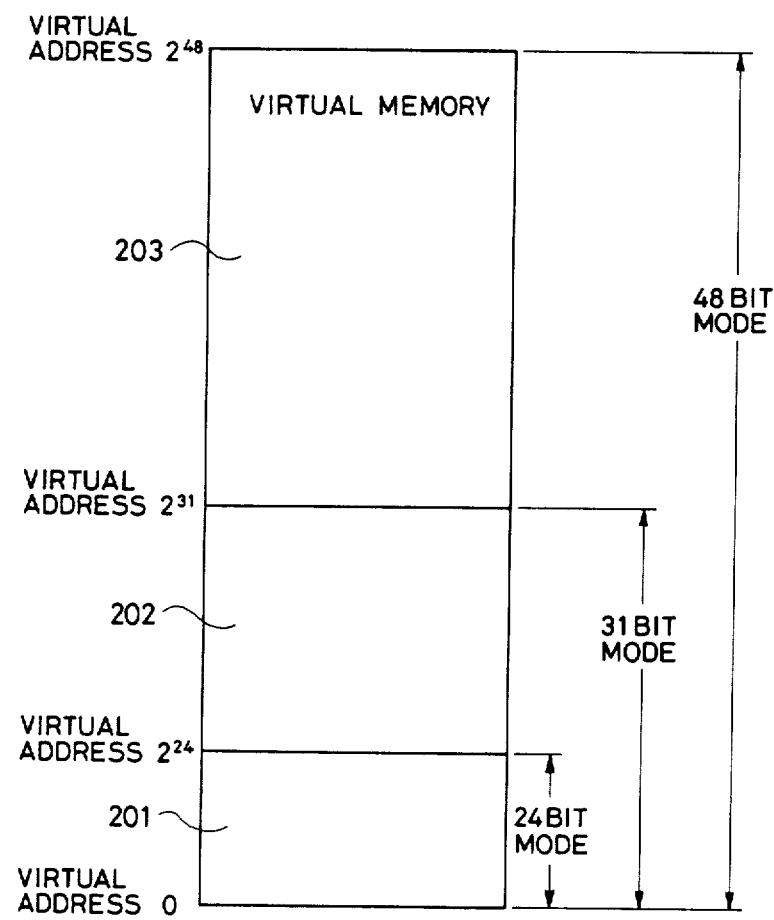
FIG. 9 illustrates a virtual storage region used in the address mode of the embodiment.

FIG. 9 shows virtual address regions which are accessible in the respective modes. When the 24-bit mode is selected, a region 201 corresponding to virtual addresses 0 to $2^{24}-1$ is accessible. Similarly, the 31-bit mode allows for access to a region 202 corresponding to virtual addresses 0 to $2^{31}-1$ and the 48-bit mode allows for access to a region 203 corresponding to virtual addresses 0 to $2^{48}-1$. The data length is consistently 32 bits irrespective of any of the address modes.

Figure 1:
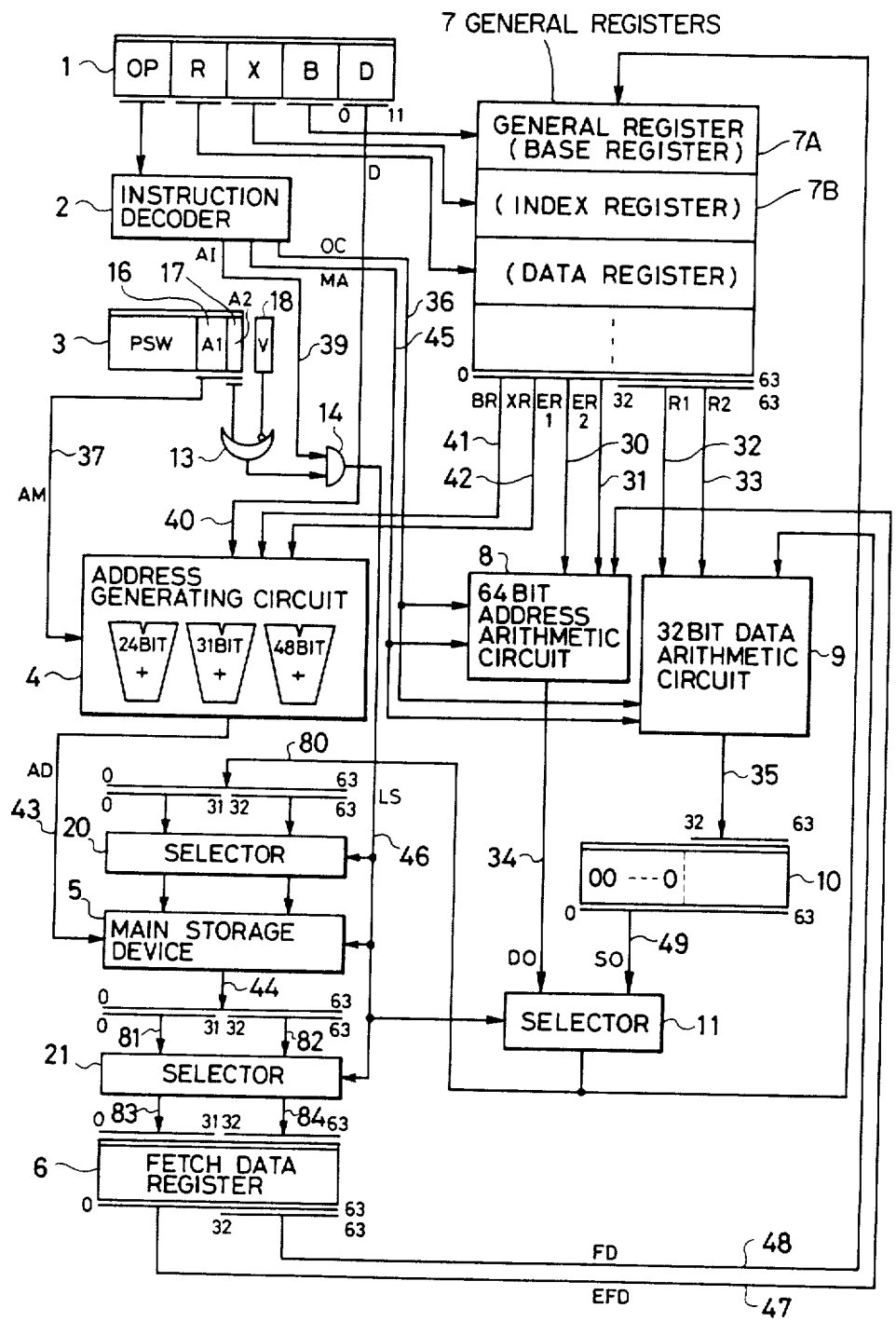
FIG. 1 is a block diagram showing the construction of a preferred embodiment of the present invention.

FIG. 1 shows the construction of the preferred embodiment in block form. The illustrated embodiment is formed including an instruction register 1 for holding therein an instruction code to be executed, an instruction decoder 2, a program status word (PSW) 3, a flip-flop 18 for controlling the number or length of bits to be handled by arithmetic or logic operations upon an address, an address generating circuit 4 for generating the real address of an operand in response to an instruction code, a main storage device 5, a fetch data register 6, sixteen 64-bit general registers 7, 64-bit address operation circuit 8, a 32-bit data operation circuit 9, a register 10, selectors 11, 20, 21, and AND gate 14 and an OR gate 13.

Figure 2:
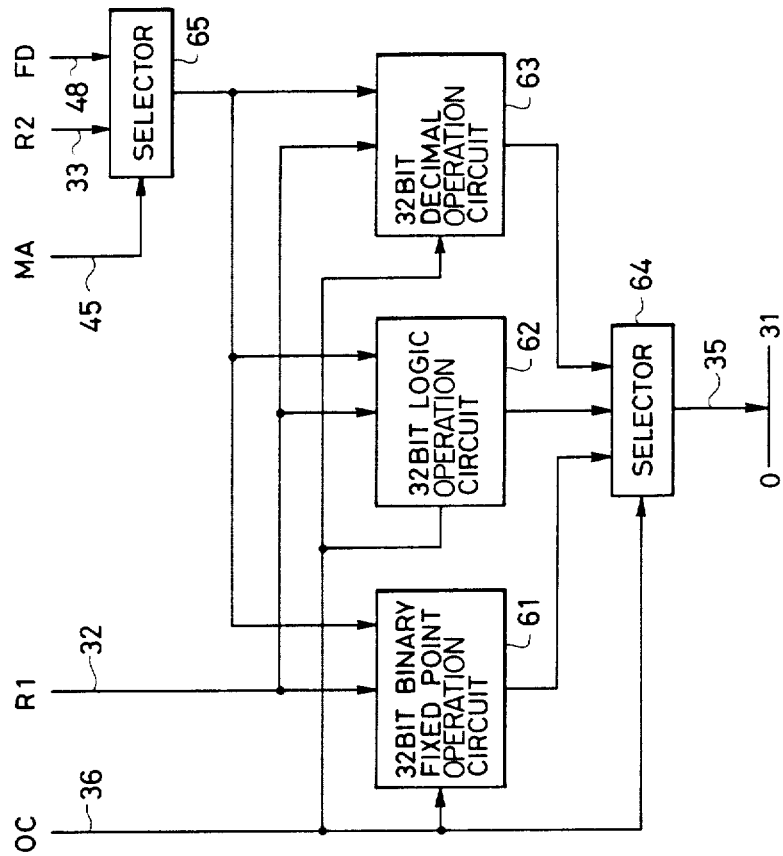
FIG. 2 is a block diagram showing the construction of a 64-bit address arithmetic circuit incorporated in the embodiment.

FIG. 2 is a block diagram of the construction of the 64-bit address operation circuit 8. The 64-bit address operation circuit 8 includes a 64-bit binary fixed point operation circuit 51, a 64-bit logic operation circuit 52 and selectors 53, 54.

Figure 3:
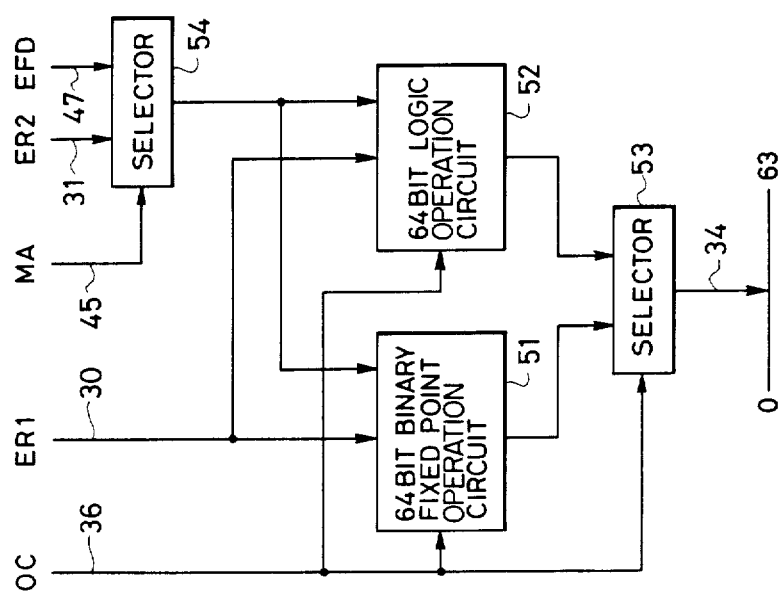
FIG. 3 is a block diagram showing the construction of a 32-bit address arithmetic circuit incorporated in the embodiment.

FIG. 3 is a block diagram of the construction of the 32-bit data operation circuit 9. The 32-bit data operation circuit 9 includes a 32-bit binary fixed point operation circuit 61, a 32-bit logic operation circuit 62, a 32-bit decimal operation circuit 63 and selectors 64, 65.

Figure 4:
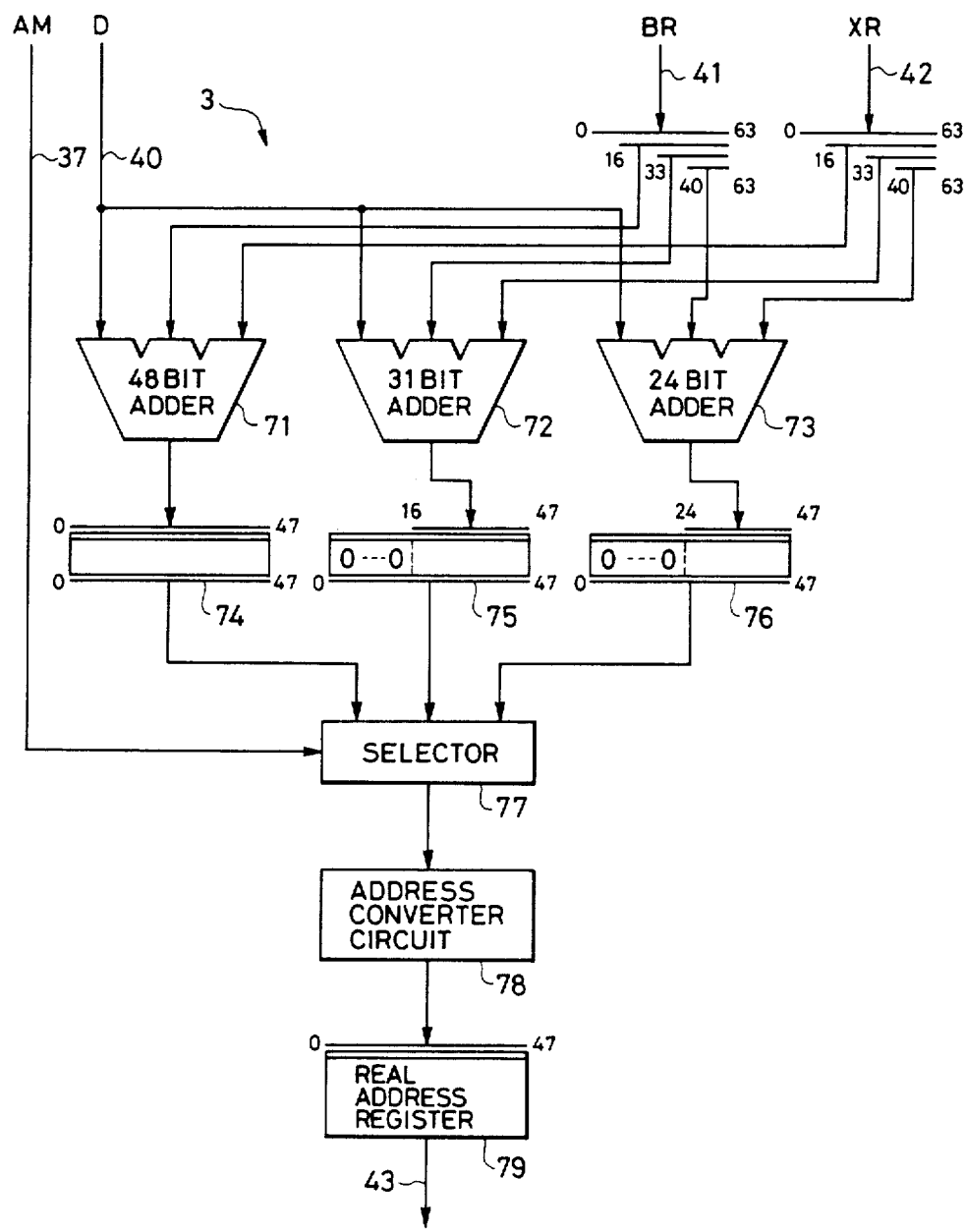
FIG. 4 is a block diagram showing the construction of an address generating circuit incorporated in the embodiment.

FIG. 4 is a block diagram of the construction of the address generating circuit 4. The address generating circuit 4 includes a 48-bit three-input adder 71, a 31-bit three-input adder 72, a 24-bit three-input adder 73, registers 74, 75 and 76 for holding therein the results of addition, a selector 77, an address converter circuit 78 for converting a virtual address to a real address and a real address register 79 for holding therein the thus-obtained real address.

FIG. 5 shows an RX instruction format 96 which is a main storage access instruction format used in the data processor constituting the preferred embodiment. The RX instruction format 96 is formed having an operation code (OP) 97, an R field 98 for the register number of a first operand, an X field 99 for the index register number of a second operand, a B field 100 for the base register number of the second operand and a D field 101 for the displacement of the second operand.

FIG. 6 shows an RR instruction format 102 which is the format of arithmetic or logic instructions. The RR instruction format 102 is formed including an operation code (OP) 103, an R1 field 104 for the register number of the first operand and an R2 field 105 for the register number of the second operand.

The program status word 3 includes bits A1 16 and A2 17 assigned to the control of the address modes. When the bits A1 16 and A2 17 are set to "0, 0", the 24-bit mode is selected. Similarly, "1, 0" corresponds to the 31-bit mode and "0, 1" or "1, 1" corresponds to the 48-bit mode.

When the filp-flop 18 is set to "0", the length processed by bits of the address operation instruction and the main storage access instruction is consistently 64 bits irrespective of the address modes. When the flip-flop 18 is set to "1", the length of bits proceded by these instructions is 32 bits in either the 24-bit address mode or the 31-bit address mode and 64 bits in the 48-bit mode.

The operation of the preferred embodiment will be described below. First, reference is made to various instructions used in the data processor constituting the preferred embodiment.

The presently preferred embodiment utilizes address operation instructions for performing arithmetic or logic operations between the general registers, data arithmetic instructions for performing arithmetic or logic operations between the general registers and the main storage access instructions for performing data transfer between the main storage device and the general registers. The address operation instructions have the RR instruction format 102, and an example of such an instruction is an unsigned binary fixed point adding instruction (ADDA instruction). The data operation instructions have the RR instruction format 102 and an example of such instructions is a signed binary fixed point adding instruction (ADD instruction). The main storage access instructions have the RX instruction format 96 and examples of such instructions are a data load instruction (L instruction) the access target of which is data, a data store instruction (ST instruction) the access target of which is also data, an address load instruction (LA instruction) the access target of which is an address and an address store instruction (STA instruction) the access target of which is also an address.

The following description refers to the operation of the embodiment during the execution of the main storage access instructions. When execution of main storage access instruction is commenced, a corresponding instruction code is stored in the instruction register 1. The instruction decoder 2 decodes the operation code OP of the main storage access instruction having the RX instruction format 96 (FIG. 5) from the instruction register 1, and provides the decoded operation code OC to a signal line 36. Simultaneously, in order to indicate the main storage access instruction, a signal MA on line 45 is set to "1", and, in the case of instructions such as the data load instruction and the data store instruction the access target of which is data, a signal AI on line 39 is set to "0" while, in the case of instructions such as the address load LA instruction and the address store instruction the access target of which is an address, the signal AI on line 39 is set to "1". The address generating circuit 4 adds the value of the D field 101 (FIG. 5) of the instruction held in the instruction register to contents of general registers (hereinafter referred to as "index register" and "base register", respectively) specified by the X field 99 and the B field 100 based on the RX instruction format 96 in the instruction register 1, thereby generating a virtual address of an operand. The addition is performed in each of the adders 71, 72 and 73 (FIG. 4) each having a different number of bits, and one of the results of addition by the three adders 71, 72 and 73 is selected depending on a signal AM on line 37, as shown in FIG. 7. More specifically, when the signal AM 37 is "0, 0" to indicate the 24-bit mode, lower-order 24 bits of each of the two general registers 7A, 7B are added to the value of the 12-bit D field 101 within the instruction register 1 by the 24-bit adder 73. The 24 bit result of such addition is supplemented with higher-order 25 bit "0"s to form a 48-bit address, stored in the 48-bit register 76, and selected by the selector 77. When the signal AM on line 37 is "1, 0" to indicate the 31-bit mode, lower-order 31 bits of each of the index and base registers 7A, 7B are subjected to similar addition by the 31-bit adder 72. The 31 bit result of such addition is likewise selected by the selector 77 after similar supplementation of 17 bit of "0"s to form a 48 bit address. When the signal AM on line 37 is "0, 1" or "1, 1" to indicate the 48-bit mode, lower-order 48 bits of the index and base registers 7A, 7B are subjected to similar addition by the 48-bit adder 71. The 48 bit result of such addition is likewise selected by the selector 77, that is, an operand address which is a virtual address is converted to a real address by the address converter circuit 78, which delivers the real address to the real address register 79. Subsequently, in the case of a load instruction such as a data load L instruction or an address load LA instruction, the main storage device 5 delivers to the fetch data register 6 the contents of the main storage corresponding to the real address in the real address register 79. When the signal LS on line 46 is "1", the main storage devices fetches data of 64 bits, and higher 32 bits and lower 32 bits of the fetched data are selected by the selector 21 and are written into higher and lower bit portions of the fetch data register 6 of 64 bit length via the lines 83 and 84 respectively, when it is "0", the main storage device 5 fetches data of 32 bits, and the 32 bit fetched data are selected by the selector 21 and are written into a lower 32 bit portion of the fetch data register 6 via the line 84. The contents of the fetch data register 6 is passed through either the 64-bit address operation circuit 8 of or the 32-bit data operation circuit 9 depending on whether or not the fetch data is 64 bits or 32 bits, and is written into the general register 7 specified by the R field 98 based on the RX instruction format 96. In case of 32 bit fetch data, the 32-bit fetch data is combined after passing through 32 bit operation circuit 9 with "0"s equivalent to higher-order 32 bits in the register 10, and the thus-obtained 64-bit data is written into the specified one general register. Similarly, in the data store case of the ST or address store STA instruction, data addresses are written from one of the general registers specified by the R field of the instruction 7 to the main storage device through 64 bit address operation circuit 8 or through the 32 bit data operation circuit 9 and the register 10 and through the selectors 11 and 20. The selector 21 selects both the higher 32 bits and lower 32 bits of the data provided by the selector 11 on line 80 when the signal LS is "1", selects only the lower 32 bits of the data on line 80 when the signal LS is "0" and provides the selected data to the main storage device 5. The main storage device 5 is constructed so as to perform a read or write operation with respect to 64 bit data when the signal LS is "1" and with respect to 32 bit data when the signal LS is "0". The signal line LS 46 is a line indicating whether a target to be handled is 32-bit data or a 64-bit address. As shown in FIG. 8, the value of the signal line LS 46 is determined by OR gates 13 and AND gate 14 in accordance with the state of the bits of the program status word 3.

The following description refers to the operation of the presently preferred embodiment during execution of the data operation instructions and the address operation instructions. When the execution of one of these instructions is commenced, a corresponding instruction code is read into the instruction register 1. The instruction decoder 2 decodes the operation code 103 based on the RR instruction format 102 (FIG. 6) which code is delivered from the instruction register 1, and provides the thus-decoded operation code OC 103 to the signal line 36. Also, in order to indicate that the one instruction is not the main storage access instruction, the signal MA on line 45 is set to "0", and the signal AI is set to "1" in the case of the address operation instruction and to "0" in the case of the data arithmetic instructions. The 32-bit data operation circuit 9 reads out lower-order 32 bits from each of the two general registers 7 specified by the R1 field 104 and the R2 field 105 of the one instruction, respectively, and performs an arithmetic or logic operation specified via the signal OC on line OC 36. When the operation is either a fixed point operation, a logic operation or a decimal operation, as shown in FIG. 3, the 32 bit result of the operation is combined with "0"s as high-order 32 bits by the register 10. The 64-bit address arithmetic circuit 8 reads out the entire 64 bits of the two registers specified by the R1 field 104 and the R2 field 105 both of which are based on the RR instruction format 102, and performs an arithmetic or logic operation specified via the signal OC on line 36 when the operation is either a fixed point operation or a logic operation. If the signal line LS 46 is "1", the selector 11 writes the output of the 64-bit address arithmetic circuit 8 to the general registers 7. If the signal line LS 46 is "0", the selector 11 writes the output of the register 10 to the general registers 7.

The state of the mode bits 16 and 17 of the program status word 3 is changed by executing a branch instruction used in saving an old mode bit and setting a new mode bit. Also, the state of the flip-flop 18 is changed using a dedicated read out instruction and a write operation. Theseinstructions are not essential to the present invention, and thus the detailed description is omitted.

In the above-described embodiment, when data is to be written to one of the general registers, the higher-order bits of the general one register upward from the length of the data are set to "0"s. Therefore, when address transfer is needed between an old program in which the length of an address is not extended and a new program in which the length of an address is extended, the result of a data operation operation performed in the old program can be used as an address in th new program. This facilitates assurance of compatibility with a conventional type of data processor. In addition, an arithmetic or logical operation can be performed by the 64 bit address operation circuit 8 upon an address having the number or length of bits exceeding the data length. This enables high-speed execution of the operation on the address as compared with a method required without the 64 bit address operation circuit 8, in which method the address is divided into high-order and lower-order portions to perform data the operation sequentially on the two portions by the 32 bit data operation circuit 9. Moreover, an address with the length of a bit string of the general registers greater than data length can be loaded or stored by means of the main storage device and selectors 20, 21 between the main storage device and the general registers. This enables high-speed load or storing of an address conventional as compared with a conventional method in which an address is divided into higher-order and lower-order portions to execute load or store of the two portions sequentially. Furthermore, if the length of an address upon which an arithmetic or logic operation should be performed and the length of an address which should be loaded or stored are fixed irrespectively of the address modes, it is possible to perform an arithmetic or logic operation upon, and loading or storing of an address of leng;th greater than the length of data in a program running in an address mode handling address length less than data length. This enables transfer of an address of length greater than data length between different address modes, one handling address length equal to or less than data length and the other handling address length less than data length. Therefore, compatibility between different modes can be easily assured. In addition, if the length of an address upon which an arithmetic or logic operation should be performed and the length of an address which should be loaded or stored are changed in accordance with the address mode, it is not necessary to perform an arithmetic a logic operation upon an address of length less than data length by means of address operation means having the number of bits exceeding the data length. It is unnecessary to store nor load such address by means storage access means having the number of bits exceeding the data length. This enables high-speed execution of an arithmetic or logic operation upon an address and high-speed loading and storage thereof.

In another form of the embodiment of the present invention, the address generating circuit 4 in the above-described embodiment may be constituted by a single 48-bit adder, and lower-order 24 and 31 bits of the result of addition may be used in 24-bit and 31-bit modes, respectivel. Also, a 64-bit operation circuit may be provided in place of the 64-bit address operation circuit 8 and the 32-bit operation circuit 9, and lower-order 32 bits of the result of the 64-bit operation on 32 bit data could be used in place of a result of an operation by the 32 bit operation circuit 9. In the above-described embodiment shown in FIG. 1, by way of example, a plurality of operation circuits 8, 9 are separately provided in order to achieve the high speed execution of or logic operation on 32-bit data.

In a second modified form of the above-described embodiment shown in FIG. 1, the 64-bit address operation circuit 8 may be constituted in 48-bit form, and thus an arithmetic a logic operation on an address could be performed on the basis of the length of 48 bits. However, in the above-described embodiment shown in FIG. 1, the length of 64 bits is illustratively adopted in order to enable simultaneous execution of an arithmetic or logic operation on data which is not an address but stored in higher-order 16 bits exceeding the most significant bit of 48 bits of a general register which holds on address of 48 bits.

In a third modified form of the present invention, in which form the flip-flop 18 is removed address operations can be always for 64 bit addresses and address and the main storage access instructions the access target of which is an address can be always for 64 bit addresses. In this case, although the speed of address operations in 24-bit and 32-bit modes may be reduced, this exerts no influence over the principal effects of the present invention.

The preferred embodiment and its modified forms have been described in detail. As described above, any of the embodiment and the modified forms is achieved by a control mechanism for controlling the general registers. However, the present invention is not confined solely to the aforesaid example.

The above description refers to the use of the general registers. An address processing similar to that of such registers may be achieved by a dedicated address register or registers.

In accordance with the present invention, since the length of an address can be extended with the length of data being the same, it is easy to transfer data between a program in which the length of an address is not extended and a program in which the length of an address is extended. This assures compatibility with conventional types of data processor.

What is claimed is:
1. A data processor, comprising:
 a main storage;
 means for specifying virtual address length selected from a first bit length (a bits) greater than a data length of a word and at least one second bit length shorter than the first bit length;
 a plurality of registers each being of a third bit length (r bits) not shorter than the first bit length each for handling a signal indicative of a virtual address or data;

operation means connected to said registers and said main storage for performing one of arithmetic or logical operations designated by an instruction, said designated operation being performed on a portion of a first signal held by a first one of the registers designated by the instruction so as to provide a second signal corresponding to a result of said designated operation to a second one of the registers designated by the instruction, wherein both the portion operated on by said designated operation within the first signal and a bit length of the second signal are not shorter than the first bit length in a first mode of operation of said operation means and are equal to a fourth bit length (d bits) shorter than the first bit length in a second mode of operation of said operation means;

access means connected to said main storage, said registers and said specifying means for generating a virtual address having the first bit length in response to a bit portion with the address length specified by said specifying means within a third signal held by a third one of said registers designated by an instruction and accessing said main storage with said generated address, said access means including means for accessing said main storage for a signal having at least the first bit length in a first mode of operation thereof and for a signal having the fourth bit length in a second mode of operation thereof, so that signals of different lengths of a significant bit portion are transferred between said main storage and said registers; and control means connected to said operation means and said access means and responsive to an instruction requiring execution of an operation by said operation means for controlling a mode of operation thereof and responsive to an instruction requiring access to said main storage by said access means for controlling a mode of operation thereof.

2. A data processor according to claim 1, wherein said control means includes means responsive to an instruction requiring execution of an operation by said operation means for controlling said operation means so as to perform the first and second mode of operation thereof, depending upon whether the instruction belongs to a first or second group of instructions respectively, at least when the address length specified by said specifying means is the first bit length and for controlling said operation means so as to perform the second mode of operation thereof at least when the specified address length is the second bit length and at the same time the instruction belongs to the second group of instructions and responsive to an instruction requiring access to said main storage by said access means for controlling said access means so as to perform the first or second mode of operation thereof depending upon whether the instruction belongs to the first or second group, respectively, at least when the specified address length is the first bit length and for controlling said access means so as to perform the second mode of operation thereof at least when the specified address length is the second bit length and at the same time the instruction belongs to the second group of instructions.

3. A data processor according to claim 2, wherein said means included in said control means includes means reponsive to an instruction requiring execution of an operation by said operation means for controlling said operation means so as to perform the first or second mode of operation thereof, respectively, depending upon whether the instructions belongs to a first or second group of instructions, irrespective of length of the specified address length and responsive to an instruction requiring access to said main storage by said access means for controlling said access means so as to perform the first or second mode of operation thereof, respectively depending upon whether the instruction belongs to the first or second group of instructions, irrespective of length of the specified address length.

4. A data processor according to claim 2, wherein said means included in said control means includes means connected to said specifying means and responsive to an instruction requiring execution of an operation by said operation means for controlling said operation means so as to perform the first or second mode of operation thereof, respectively when the specified address lengthis the first bit length the and the instruction belongs to the first group of instructions or when the specified address length is the second bit length or the instruction belongs to the second group of instructions and responsive to an instruction requiring access to said main storage for controlling said access means so as to perform the first or second mode of operation thereof, respectively when the specified address length is the first bit length or when the specified address length is the second bit length or the instruction belongs to the second group of instructions.

5. A data processor according to claim 1, wherein said operation means includes:

first operation means for performing one of a first group of arithmetic or logical operations on a bit portion not shorter than the first bit length within a signal held by one of said registers and providing a signal corresponding to a result of the one operation not shorter than the first bit length;

second operation means for performing one of a second group of arithmetic or logical operations on a bit portion with the fourth bit length within a signal held by one of said registers and providing a signal corresponding to a result of the one operation having the second bit length.

6. A data processor according to claim 5, wherein said operation means further includes means connected to said second operation means for generating a signal having bit length not shorter than the first bit length and including the signal provided by said second operation means at a lower bit portion and bits of zero at an upper bit portion so as to provide the generated signal to one of said registers to be stored thereinto.

7. A data processor according to claim 6,
wherein said operation means further includes select means connected to said first operation means and said generating means for selectively transferring one of the signals provided by said first operation means and said generating means.

8. A data processor according to claim 6,
wherein the third bit length is longer than the first bit length;
wherein bit length of a signal which receives an operation by said first operation means is equal to the third bit length of a signal provided by said first operation means is equal to the third bit length; and
wherein bit length of a signal generated by said generating means is equal to the third bit length.

9. A data processor according to claim 5,
wherein a total number of the first group of arithmetic or logical operations is smaller than a total number of the second group of arithmetic or logical operations.

10. A data processor according to claim 1,
wherein said operation means includes means for providing, as the second data signal corresponding to the result of the operation by said operation means, a signal having predetermined bit length not shorter than the first bit length irrespective of whether the mode of operation by said operation means is the first or second mode of operation thereof.

11. A data processor according to claim 10,
wherein bit length of a bit portion which receives an operation by said operation means in the first mode of operation thereof and the predetermined bit length is equal to the third bit length.

12. A data processor according to claim 11,
wherein the third bit length is longer than the first bit length.

13. A data processor according to claim 11,
wherein said main storage means includes means for performing a write or lead operation for a signal having the third bit length in the first mode of operation thereof and for a signal having the fourth bit length in the second mode of operation thereof;
wherein said operation means includes means for receiving, from said main storage, a signal of the fourth bit length to be provided to one of the registers and for generating a signal of the third bit length including the received signal as a significant bit portion so as to provide the generated signal to said one register in the second mode of operation of said operation means; and
wherein said access means includes means for receiving a signal having the third bit length from said operation means and providing a signal comprised of a significant bit portion having the fourth bit length to said main storage to be stored therein in the second mode of operation thereof.

* * * * *